Figure 1:
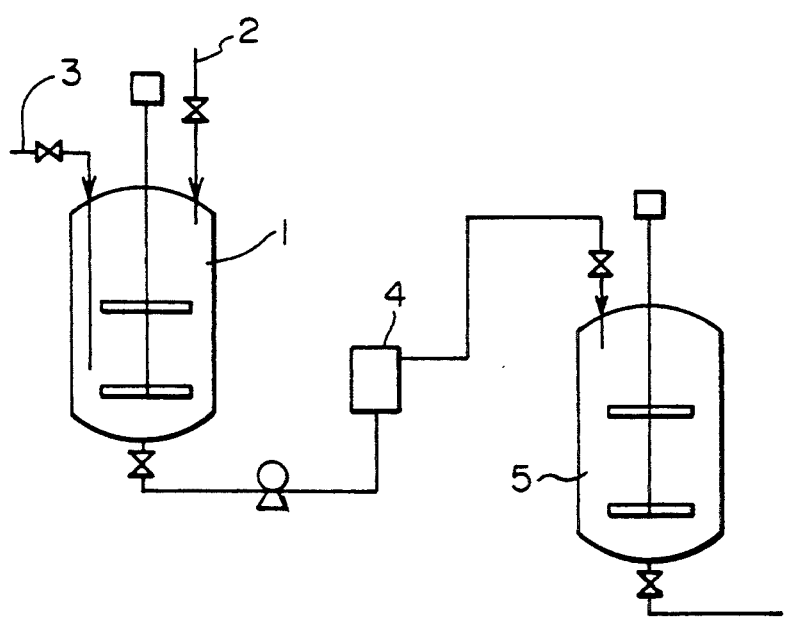

United States Patent [19]

Kikumoto et al.

[11] Patent Number: 5,319,065

[45] Date of Patent: Jun. 7, 1994

[54] PROCESS FOR PRODUCING POLYCARBONATE RESIN HAVING SPECIFIC TERMINAL OH/CO VALUE

[75] Inventors: Shinji Kikumoto; Hiroki Okuyama; Akiyoshi Manabe; Hidekazu Ito, all of Matsuyama, Japan

[73] Assignee: Teijin Chemicals, Ltd., Tokyo, Japan

[21] Appl. No.: 48,586

[22] Filed: Apr. 19, 1993

Related U.S. Application Data

[63] Continuation of Ser. No. 846,580, Mar. 5, 1992, abandoned.

[30] Foreign Application Priority Data

Mar. 5, 1991 [JP] Japan .................. 3-062501

[51] Int. Cl.⁵ .................................................. C08G 64/20
[52] U.S. Cl. .................................. 528/198; 528/125; 528/126; 528/171; 528/174; 528/196; 528/201
[58] Field of Search ............... 528/198, 196, 125, 126, 528/171, 174, 201

[56] References Cited

U.S. PATENT DOCUMENTS

| | | | |
|---|---|---|---|
| 4,939,230 | 7/1990 | Munjal et al. | 528/198 |
| 4,959,456 | 9/1990 | Ashida et al. | 528/198 |
| 4,977,233 | 12/1990 | Okamoto et al. | 528/198 |
| 4,997,903 | 3/1991 | Okamoto | 528/198 |
| 5,037,941 | 8/1991 | Weston et al. | 528/198 |
| 5,037,942 | 8/1991 | Hunt et al. | 528/198 |

FOREIGN PATENT DOCUMENTS

0434888 7/1991 European Pat. Off. .

OTHER PUBLICATIONS

JP-62-089 723, Teijin Chem., Ltd., "Production of Polycarbonate", Apr. 24, 1987, p. 1.
Encyclopedia Ind. Chem. Anal., vol. 17, Jun. 1973, pp. 329–352, Horbach, et al., "Polycarbonates".

Primary Examiner—Harold D. Anderson
Attorney, Agent, or Firm—Sherman and Shalloway

[57] ABSTRACT

There is provided a process for producing a polycarbonate resin containing less amounts of a terminal OH group and a residual monomer and having excellent heat resistance efficiently with a simple equipment. Said process comprises emulsifying an oligomer-containing reaction mixture obtained by the reaction of an alkaline aqueous solution of an aromatic dihydroxy compound with phosgene in the presence of an organic solvent, after adding a molecular weight modifier thereto, and performing polymerization while the reaction mixture is allowed to stand still in the emulsified state.

11 Claims, 1 Drawing Sheet

PROCESS FOR PRODUCING POLYCARBONATE RESIN HAVING SPECIFIC TERMINAL OH/CO VALUE

This application is a continuation of application Ser. No. 07/846,580, filed Mar. 5, 1992, now abandoned.

This invention relates to a process for producing a polycarbonate resin. More specifically, this invention relates to a process for producing a high-molecular polycarbonate resin having excellent heat resistance.

A process in which a high-molecular polycarbonate resin is produced by polymerization in an emulsified state is disclosed in, e.g., Japanese Patent Publication No. 2198/1962. This prior art, however, only indicates that an oligomer solution is emulsified and polymerization is then conducted with stirring at 120 to 300 rpm; nothing is described about the reaction without stirring.

In the production of the polycarbonate resin, it has been deemed advantageous from the aspects of a reaction rate and uniformity that after emulsifying, stirring is strengthened. However, the emulsified state has to be maintained during the polymerization reaction in such a process too, and it often tends to worsen. In order to keep an emulsified state good, a process has been proposed in which an aromatic dihydroxy compound is further added while maintaining an emulsified state to increase the concentration of the aromatic dihydroxy compound of the reaction mixture in the emulsified state (Japanese Laid-open Patent Application (Kokai) No. 9328/1983). Nevertheless, when the concentration of the aromatic dihydroxy compound of the reaction mixture is increased, the amount of the terminal OH group in the obtained polymer becomes large and further a large amount of the aromatic dihydroxy compound remains in the polymer, worsening heat resistance of the resulting polycarbonate resin and decreasing its yield.

It is an object of this invention to provide a process for producing a polycarbonate resin containing fewer terminal OH groups and less residual monomer and having excellent heat resistance efficiently with a simple equipment.

The present inventors have made studies to achieve this object, and as a result, have found the astonishing fact that even when the concentration of the aromatic dihydroxy compound of the reaction mixture in the emulsified state is low, the emulsified state is kept good and the polymerization reaction easily proceeds by allowing the reaction mixture to stand still without stirring, making it possible to obtain a polycarbonate resin having excellent heat resistance in high yield.

Thus, according to this invention, there is provided a process for producing a polycarbonate resin having a ratio of terminal OH to CO (terminal OH/CO) ratio of 0.25 or less found from a ratio of absorbances of terminal OH (hydroxl) and CO (carbonyl) measured by an infrared spectrophotometer, which comprises emulsifying an oligomer-containing reaction mixture obtained by the reaction of an alkaline aqueous solution of an aromatic dihydroxy compound with phosgene in the presece of an organic solvent, after adding a molecular weight modifier thereto, and performing polymerization while the reaction mixture is allowed to stand still in the emulsified state.

The aromatic dihydroxy compound used here is preferably 2,2-bis(4-hydroxyphenyl)propane (bisphenol A); part or the whole thereof may be replaced with the other aromatic dihydroxy compound. Examples of the other aromatic dihydroxy compound are bis(4-hydroxyphenyl)-methane, 1,1-bis(4-hydroxyphenyl)ethane, 2,2-bis(4-hydroxyphenyl)butane, 1,1-(4-hydroxyphenyl)cyclohexane, 1-phenyl-1,1-bis(4-hydroxyphenyl)ethane, 2,2-bis(4-hydroxyphenyl)octane, bis(4-hydroxydiphenyl)ether, bis(4-hydroxyphenyl)ketone, bis(4-hydroxyphenyl)sulfone, hydroquinone, resolcinol, 4,4'-dihydroxydiphenyl, 2,6-dihydroxynaphthalene, and their lower alkyl- or halo-substituted substances.

As an alkali used in the alkaline aqueous solution of the aromatic dihydroxy compound, strongly basic hydroxides such as sodium hydroxide and potassium hydroxide are desirous. The basic hydroxide is ordinarily used as an aqueous solution, and the concentration is usually 5 to 10% by weight. It is advisable that the amount of the basic hydroxide is a bit larger than 2 mols (theoretical amount) per mol of the aromatic dihydroxy compound, i.e., 2.2 to 3 mols per mol of the aromatic dihydroxy compound.

Examples of the organic solvent are tetrachloroethane, methylene chloride, 1,2-dichloroethane, chloroform, and 1,1,2-trichloroethane. They are used either singly or in combination. It is advisable that the solvent is used in such an amount that the concentration of the polycarbonate oligomer in the solution is 10 to 30% by weight.

As the molecular weight modifier, monohydric phenols are used, and examples thereof are phenol, p-tert-butyl phenol, and 2,4,6-tribromophenol.

In the process of this invention, the alkaline aqueous solution of the aromatic dihydroxy compound and phosgene are first subjected to a phosgenation reaction in the presence of the organic solvent in a usual manner, and the obtained oligomer-containing reaction mixture is emulsified after adding the molecular weight modifier thereto. Emulsifying is conducted by any device such as a homomixer, a tank fitted with a stirring blade or a static mixer. Especially, the homomixer is preferable because emulsified droplets can be finely divided. It is advisable that the temperature of the reaction mixture in emulsifying is adjusted to 25° to 35° C. because the polymerization reaction after emulsifying proceeds easily and purification also becomes easy after the reaction is over.

In the process of this invention, the polymerization reaction is performed while the emulsified reaction mixture is allowed to stand still in the emulsified state. The polymerization advances by allowing the emulsified reaction mixture to stand still at a temperature of preferably 25° to 35° C. After the polymerization reaction is terminated, the reaction mixture is separated into an organic solution layer and an aqueous layer, and the organic solution layer is purified and treated in a usual manner to obtain a polycarbonate powder. The termination of the polymerization reaction is found by destruction of the emulsified state. The termination of the polymerization, i.e. the intended degree of polymerization, is determined by the amount of the molecular weight modifier added before emulsifying. By the way, "allowed to stand still" as herein referred to means that stirring with a stirrer is not conducted, nor is there used a device for conducting forced or intended mixing, such as a static mixer, an orifice mixer, a colloid mill, a flow jet mixer or an ultrasonic wave. Moreover, the process of this invention can be carried out continuously unless the thought of this invention is deviated from. In the process of this invention, a catalyst ordinarily used to produce a polycarbonate resin can be used in a usual manner as required. Examples of the catalyst are triethylamine, trimethylbenzylammonium chloride, and tetraethylammonium bromide.

This invention will be illustrated specifically by the following Examples and Comparative Examples.

The attached drawing is a sketch of a device used in said Examples.

In the drawing, 1 is a phosgenation reaction vessel fitted with a stirring blade, 2 a chemical liquid (containing an alkaline aqueous solution of an aromatic dihydroxy compound, an organic solvent, and a molecular weight modifier) inlet, 3 a phosgene blowing inlet, 4 a homomixer and 5 a polymerization reaction vessel fitted with a stirring blade.

Parts and % in said Examples are all by weight.

Methods for evaluating properties in said Examples are as follows.

The concentration of a residual monomer in an aqueous layer when the reaction was over was measured with an absorbance (294 nm) of an ultraviolet (UV) visible spectrophotometer.

The amount of a terminal OH group was determined from a ratio of absorbances of OH (3579 cm$^{-1}$) and CO (3523 cm$^{-1}$) measured with an infrared (IR) spectrophotometer by dissolving 0.6 g of polycarbonate in 20 ml of methylene chloride.

Heat resistance was evaluated by treating a molded plate at 150° C. for 20 days and then measuring b values before and after treating. The b value was measured with a color difference meter manufactured by Suga Shikenki K.K.

The amount of the residual monomer in the polymer was measured with a liquid chromatograph (LC) manufactured by Waters.

The molecular weight M was found by inserting in the following equation specific viscosity $\eta_{sp}$ determined for a solution dissolved at 20° C. in methylene chloride in a concentration of 0.7 g/dl.

$$\eta_{sp}/C = [\eta] + 0.45 \times [\eta]^2 C$$

wherein $[\eta] = 1.23 \times 10^{-4} \times M$, and $C = 0.7$.

Water washing property of a polycarbonate solution is rated as follows.
⊚: very good
○: good
Δ: poor
X: very poor

EXAMPLE 1

A solution obtained by dissolving 2.23 parts of bisphenol A and 0.005 part of in 10.7 parts hydrosulfite of a 10% NaOH aqueous solution was charged in a reaction vessel 1, and 9 parts of methylene chloride were then charged therein, followed by blowing 1.12 parts of phosgene with stirring at 210 rpm over 90 minutes under a reaction temperature of 25±1° C. Then, 0.64 part of a NaOH aqueous solution of p-tert-butyl phenol (a concentration of p-tert-butyl phenol 69.1 g/liter, a concentration of NaOH 12.5 g/liter) was charged as a molecular weight modifier, and the reaction mixture was stirred with an SL-type homomixer 4 at 8,000 rpm for 2 minutes to render the reaction mixture in a highly emulsified state. The emulsified reaction mixture was fed to a polymerization reaction vessel 5, and kept still at a temperature of 30±1° C. without stirring to conduct the polymerization reaction for 2 hours. When the polymerization was over, the amount of the residual monomer in the aqueous solution was 1.2 g/liter. To the solution was added methylene chloride until the concentration of the polycarbonate resin in the methylene chloride layer reached 12%. After the aqueous layer was removed by separation, the methylene chloride layer (a polycarbonate resin solution) was well washed with water. Subsequently, the polycarbonate resin solution was charged in a kneader, and the solvent was removed to obtain a polycarbonate powder. After dehydration, the product was dried with a hot air circulation-type drier at 140° C. for 10 hours, and then pelletized with an extruder at 280° C.

The molecular weight, the amount of OH (terminal OH/CO), heat resistance, etc. of the pellets were measured with the results shown in Table 1.

EXAMPLE 2

Example 1 was repeated except that the amount of phosgene was changed into 1.13 parts. When the polymerization reaction was over, the amount of the residual monomer in the aqueous solution was 0.6 g/liter. The subsequent treatment was conducted as in Example 1 to obtain pellets.

The average molecular weight, the amount of OH (terminal OH/CO), heat resistance, etc. of the pellets were measured with the results shown in Table 1.

EXAMPLE 3

A solution obtained by dissolving 2.23 parts of bisphenol A and 0.005 part of hydrosulfite in 10.7 parts of a 10% NaOH aqueous solution was charged in the reaction vessel 1, and 9 parts of methylene chloride were then charged, followed by blowing 1.12 parts of phosgene with stirring at 210 rpm over 90 minutes under a reaction temperature of 25±1° C. Then, 0.3 part of a NaOH aqueous solution of bisphenol A (a concentration of bisphenol A 50 g/liter, a concentration of NaOH 18 g/liter) and 0.09 part of a NaOH aqueous solution of p-tert-butyl phenol (a concentration of p-tert-butyl phenol 69.1 g/liter, a concentration of NaOH 12.5 g/liter) were charged, and the reaction mixture was stirred with the SL-type homomixer 4 at 8,000 rpm for 2 minutes to render it in a highly emulsified state. The emulsified reaction mixture was fed to the polymerization reaction vessel 5, and kept still at a temperature of 30±1° C. without stirring to conduct the polymerization reaction for 2 hours. When the polymerization was over, the amount of the residual monomer in the aqueous solution was 1.5 g/liter. The subsequent treatment was conducted as in Example 1 to obtain pellets.

The average molecular weight, the amount of OH (terminal OH/CO), heat resistance, etc. of the pellets were measured with the results shown in Table 1.

EXAMPLE 4

A solution obtained by dissolving 2.23 parts of bisphenol A and 0.005 part of hydrosulfite in 10.7 parts of a 10% NaOH aqueous solution was charged in the reaction vessel 1, and 9 parts of methylene chloride was then charged, followed by blowing 1.12 parts of phosgene at 210 rpm over 90 minutes under a reaction temperature of 25±1° C. Subsequently, 0.6 part of a NaOH aqueous solution of bisphenol A (a concentration of bisphenol A 50 g/liter, a concentration of NaOH 18 g/liter) and 0.03 parts of a NaOH aqueous solution of p-tert-butyl phenol (a concentration of a p-tert-butyl phenol 69.1 g/liter, a concentration of NaOH 12.5 g/liter) as a molecular weight modifier were charged, and the reaction mixture was then stirred with the SL-type homomixer 4 at 8,000 rpm for 2 hours to render it in a highly emulsified state.

The average molecular weight, the amount of OH (terminal OH/CO), heat resistance, etc. of the pellets were measured with the results shown in Table 1.

TABLE 1

| | Amount of a monomer in an aqueous solution when the reaction is over (g/liter) | Pellets | | | | Heat resistance | | Water washing property |
|---|---|---|---|---|---|---|---|---|
| | | Molecular weight | b value | Amount of a monomer (ppm) | Amount of OH | before treatment | after treatment | |
| Example 1 | 1.2 | 29000 | 0.3 | 50 | 0.20 | 3.4 | 5.2 | ⊚ |
| Example 2 | 0.6 | 30500 | 0.2 | 35 | 0.12 | 3.3 | 5.0 | ⊚ |
| Example 3 | 1.5 | 70700 | — | 55 | 0.23x | — | — | — |
| Example 4 | 1.9 | 121400 | — | 70 | 0.25x | — | — | — |
| Comparative | | | | | | | | |
| Example 1 | 0.8 | 15000 | 5.0 | 70 | 0.10 | 7.0 | 26.0 | X |
| Example 2 | 4.0 | 23000 | 0.6 | 200 | 0.52 | 3.7 | 17.5 | Δ |
| Example 3 | 3.5 | 26500 | 0.4 | 120 | 0.33 | 3.5 | 14.0 | ○ | x: film

The emulsified reaction mixture was fed to the polymerization reaction vessel 5, and kept still at a temperature of 30±1° C. without stirring to conduct the polymerization reaction for 2 hours. When the reaction was over, the amount of the residual monomer in the aqueous solution was 1.9 g/liter. The subsequent treatment was conducted as in Example 1 to obtain pellets.

The average molecular weight, the amount of OH (terminal OH/CO), heat resistance, etc. of the pellets were measured with the results shown in Table 1.

COMPARATIVE EXAMPLE 1

Example 1 was repeated except that stirring was conducted at 40 rpm in the polymerization reaction vessel. The average molecular weight, the amount of OH (terminal OH/CO), heat resistance, etc. of the obtained pellets were measured with the results shown in Table 1.

Thirty minutes after start-up of the polymerization reaction, the emulsified state was collapsed, the amount of chloroformate was large and the polymerization time of 2 hours was insufficient, so that the quality of the obtained polymer was quite bad.

COMPARATIVE EXAMPLE 2

Comparative Example 1 was repeated except for the blowing of 1.1 parts of phosgene. When the polymerization reaction was over, the amount of the monomer in the aqueous solution was 4.0 g/liter. The subsequent treatment was conducted as in Example 1 to obtain pellets.

The average molecular weight, the amount of OH (terminal OH/CO), heat resistance, etc. of the pellets were measured with the results shown in Table 1.

COMPARATIVE EXAMPLE 3

After the highly emulsified solution was fed to the polymerization reaction vessel 5 in Example 1, stirring started at 40 rpm, and simultaneously 0.9 part of a NaOH aqueous solution of bisphenol A (a concentration of bisphenol A 50 g/liter, a concentration of NaOH 18 g/liter) was added at 30±1° C. over 1 hour. One hour later, the polymerization was finished. When the polymerization was over, the amount of the monomer in the aqueous solution was 3.5 g/liter. The subsequent treatment was conducted as in Example 1 to obtain pellets.

The above Examples reveal that the process of this invention can be performed either by simply stopping the operation of the stirring means in the conventional polymerization device or by means of a quite simple device, and a polycarbonate having good heat resistance can be produced with fewer terminal OH groups and less residual aromatic dihydroxy compound.

What we claim is:

1. A process for producing a polycarbonate resin having a terminal hydroxyl group/carbonyl group (terminal OH/CO) ratio of 0.25 or less, as determined by the ratio of absorbance of terminal OH to CO groups measured by an infrared spectrophotometer, which comprises emulsifying a polycarbonate oligomer-containing reaction mixture obtained by the reaction of an alkaline aqueous solution of an aromatic dihydroxy compound with phosgene in the presence of an organic solvent, after adding a molecular weight modifier thereto and polymerizing the reaction mixture in the emulsified state without stirring said reaction mixture.

2. The process of claim 1 wherein the alkaline aqueous solution of the aromatic dihydroxy compound comprises a strongly basic hydroxide selected from the group consisting of sodium hydroxide and potassium hydroxide.

3. The process of claim 2 wherein the basic hydroxide is present at a concentration of 5 to 10% by weight.

4. The process for claim 2 wherein the amount of basic hydroxide is in the range of 2.2 to 3 mols per mol of the aromatic dihydroxy compound.

5. The process of claim 1 wherein the polycarbonate oligomer is present at a concentration of 10 to 30% by weight.

6. The process of claim 1 wherein the molecular weight modifier is a monohydric phenol.

7. The process of claim 1 which further comprises the addition of a polymerization catalyst to the reaction mixture.

8. The process of claim 1 wherein the ratio of terminal hydroxyl groups to carbonyl groups (terminal OH/CO) is in the range of from 0.12 to 0.25.

9. A process for producing a polycarbonate resin having a ratio of terminal hydroxyl (terminal OH) groups to carbonyl (CO) groups (terminal OH/CO) of 0.25 or less, as determined by the ratio of absorbance of terminal OH and CO groups measured by an infrared spectrophotometer, which comprises (1) preparing a polycarbonate oligomer containing reaction mixture by the reaction between an aqueous alkaline solution of an aromatic dihydroxy compound and phosgene in the presence of an organic solvent, (2) adding a molecular weight modifier to the resulting reaction mixture of step (1), (3) subjecting the mixture resulting from step (2) to mixing to form an emulsified reaction mixture containing said polycarbonate oligomer and said molecular weight modifier, and (4) polymerizing the emulsified reaction mixture of step (3) without subjecting said reaction mixture to stirring, whereby the terminal OH/CO ratio of the resulting polycarbonate resin is no more than 0.25.

10. The process of claim 9 wherein in step (4), the emulsified reaction mixture of step (3) is polymerized at a temperature in the range of from 25° C. to 35° C.

11. The process of claim 9 wherein the ratio of terminal hydroxyl groups to carbonyl groups (terminal OH/CO) is in the range of from 0.12 to 0.25.

* * * * *